UNITED STATES PATENT OFFICE 2,112,813

PROCESS OF ELIMINATING IRON AND OTHER IMPURITIES FROM CAUSTIC SODA

Domingo Lopez, Charleston, W. Va., assignor to Westvaco Chlorine Products Corporation, New York, N. Y., a corporation of Delaware No Drawing. Application March 8, 1934, Serial No. 714,737

3 Claims. (Cl. 23—184)

This invention relates to a process by means of which the iron present in the caustic soda liquors produced by electrolytic or any other means, as soluble impurity, is reduced to the point of not being objectionable to the most exacting requirements, if so desired.

The demand in the market for caustic soda containing a very minimum of iron has stimulated the producer to find new ways for the elimination of that and other impurities.

It is well known that most of the salts can be refined by crystallization followed by a mechanical separation of the crystals from the mother liquor.

Liquid caustic can be obtained by evaporation to different concentrations, each one capable of producing crystals when the solution is cooled to the proper temperature; these crystals when re-dissolved produce a liquid of greater purity than the original one, nevertheless from the commercial and from the technical point of view not all the concentrations are suitable. I have discovered that by concentrating a solution of caustic soda containing about 50% NaOH and about 1.2% of NaCl, up to 57% concentration as minimum and 65% concentration as maximum, and then causing crystallization by extraction of heat, the crystals as actually produced when separated from the mother liquor are practically iron free, but when concentrating above 65% or even at 65% concentration, the impurities are separated from the crystals to a much smaller extent than for concentrations below 65%. This occurrence is natural and is anticipated by the theory; the actual crystals that are collected as the product of the crystallizing process are of the kind of pure monohydrate crystals, (NaOH.H$_2$O) together with a certain amount of mother liquor frozen on their surface. Now these crystals so produced with frozen mother liquor on their surface contain a nearly constant overall percent of NaOH as they are delivered, as from a centrifugal crystal separating machine in most cases running from 67.5 percent to 68 plus % NaOH, and for a determined type of centrifugal machine and for set conditions this percent of NaOH content can be considered as fixed. If we adopt 67.5%, NaOH as the overall value of NaOH content of the crystals and frozen mother liquor so produced in the actual crystals, the amount of mother liquor attached to the crystals will be expressed as follows:

$$y = \frac{69 - 67.5}{69 - m} = \frac{1.5}{69 - m}$$

In this formula, 69 is the percent NaOH in the pure monohydrate crystals and (m) the percent of NaOH in the residue mother liquor. It will be clearly seen that y the percent of mother liquor frozen on the crystals increases when (m) increases up to the limit 69, and that naturally occurs when the concentration of the liquor to crystallize runs high. (The concentration m, of the mother liquor runs about 1.5 to 2% below the concentration of the concentrate or liquor to crystallize.)

This relation may be deduced as follows:
Let:

K=percent by weight of pure monohydrate crystals of NaOH.H$_2$O which is NaOH.
m=percent by weight of mother liquor which is NaOH.
c=overall percent by weight of actual aggregate crystals produced which is NaOH.
y=percent of total weight of aggregate crystals produced which is frozen mother liquor.
W=total weight of aggregate crystals produced.
D=total weight of frozen mother liquor on crystals produced.

Then:
$$cW = K(W-D) + mD$$
Whence:
$$D = W\frac{K-c}{K-m}$$
and since
$$y = \frac{D}{W}$$
$$y = \frac{K-c}{K-m}$$

The quantity K, which is the percent by weight of pure monohydrate crystals NaOH.H$_2$O which is NaOH, is equal to $$\frac{40}{40+18} = 68.98\%, \text{ or } 69\%.$$

If we take the value of c as 67.5 we have $$y = \frac{69 - 67.5}{69 - m} = \frac{1.5}{69 - m}$$

This is the equation of an equilateral hyperbola, and it is found that the value of y increases rapidly when m gets as large as 65. A value for c as high as 67.5 can be obtained by using a good centrifugal crystal separating machine and careful handling.

This equation indicates the degree of purification that may be expected in using my process. It is obvious that concentrations of NaOH in the concentrate closely approaching as high a concentration as 69% should be avoided, since they will correspond to large values of $y$, and, therefore, large amounts of mother liquor with its included impurities frozen to the crystals.

The viscosity increases with the caustic concentrations. The greater the viscosity, the harder to eliminate the mother liquor and the iron which it contains.

In a process in which the actual aggregate crystals produced contain 67.5% NaOH, the NaOH content of the mother liquor becomes equal to that of the concentrate, that is, for a concentrate of 67.5% NaOH. In other words, in such a case, concentrate, mother liquor and crystals would show the same analysis of 67.5% NaOH.

In a like process in which the concentrate contains only 60% NaOH, the mother liquor is of 56.79% NaOH.

For the reasons already stated, I prefer to use a concentrate of concentration from 62% to 63% NaOH, which permits to obtain crops of crystals as high as 40% of the weight of the 63% caustic solution used without introducing any difficulty in the manipulation and delivering a product which when dissolved and diluted to 50% would contain no more than 10 to 12 parts per million of iron as Fe, if the liquor of 50% NaOH and 1.2 percent NaCl did not contain more than 40 to 50 parts Fe per million at the start.

I found also that the degree of purification can be increased by washing with a pulp of caustic made out of crystals and liquor not containing more than 30 to 40 parts of iron per million, and no more than 1.2% NaCl, or moistening the chamber of the centrifugal crystal separating machine with a mist of water or steam. The other impurities susceptible of being removed by identical process decrease in an almost parallel manner, although at high concentrations when the consistency of the pulp has been allowed to go too far, the salt, for instance, is not eliminated as efficiently as is the iron.

The process may be illustrated as follows:

Caustic soda liquor containing about 50% NaOH, not more than 1.2% NaCl and about 40 parts per million of iron as Fe, usually starting with cold liquor to keep down the NaCl content, is concentrated by heating in a non-iron metal evaporator up to 57 percent or to 63 percent NaOH. Heat is abstracted until the temperature falls to 48° C. (for 57% concentration) and to 60° C. (for 63% concentration) respectively, the mass being stirred in order to help dissipation of heat, and, when the crystallization has started, to prevent the formation of clusters. The temperature is allowed to drop down to 43° C. in the first case and to 57° C. in the second to secure a yield of about 25% in the first and of about 35% in the second case. During the cooling and crystallization the mass will in practice be flowing from one end to the other of the crystallizer and dropping into a crystal separating centrifugal machine. At those temperatures the pulp is delivered into a centrifugal crystal separating machine warmed and kept at the temperature of the crystals or slightly thereabove. The mother liquor is brought back into the system or it is brought to a second crystallization if the concentration of impurities is not too great.

It is obvious that my invention may be varied somewhat as to details without departing from the spirit thereof.

Having thus described the invention, what is claimed is:

1. In purifying caustic soda by crystallization of $NaOH.H_2O$ from caustic solutions containing dissolved iron, a process of producing a caustic low in iron which comprises evaporating the solution to a concentration of substantially 63 per cent NaOH, cooling the concentrated solution to substantially 60° C., crystallizing out about 35 per cent of the caustic as monohydrate and separating from the crystals a mother liquor containing about 70 per cent or more of the dissolved iron of the original solution.

2. A process of producing a purified caustic soda from an evaporated electrolytic cell liquor containing approximately 50 per cent NaOH, 1.2 per cent NaCl and 40 parts dissolved iron per million which comprises concentrating the liquor until it contains substantially 63 per cent NaOH, cooling the concentrated liquor to substantially 60° C., crystallizing $NaOH.H_2O$ from the cooled liquor and centrifuging from the crystals a mother liquor containing most of the dissolved iron.

3. In the purification of caustic soda, a method of removing iron and salt which comprises preparing a solution containing approximately 63 per cent NaOH, cooling this solution to approximately 60° C. to crystallize the caustic as monohydrate and separating the crystals from a mother liquor carrying iron and salt.

DOMINGO LOPEZ.